United States Patent
Ballai et al.

(10) Patent No.: US 11,755,530 B2
(45) Date of Patent: *Sep. 12, 2023

(54) METHOD AND SYSTEM FOR APPLYING DATA RETENTION POLICIES IN A COMPUTING PLATFORM

(71) Applicant: Twilio Inc., San Francisco, CA (US)

(72) Inventors: Adam Ballai, San Francisco, CA (US); Timothy S. Milliron, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,287

(22) Filed: Apr. 22, 2022

(65) Prior Publication Data
US 2022/0245090 A1    Aug. 4, 2022

Related U.S. Application Data

(63) Continuation of application No. 16/894,341, filed on Jun. 5, 2020, now Pat. No. 11,341,092, which is a
(Continued)

(51) Int. Cl.
*H04L 9/40* (2022.01)
*G06F 16/11* (2019.01)
*G06F 21/62* (2013.01)

(52) U.S. Cl.
CPC .......... *G06F 16/125* (2019.01); *G06F 16/113* (2019.01); *G06F 21/6245* (2013.01); *H04L 63/04* (2013.01); *H04L 63/105* (2013.01)

(58) Field of Classification Search
CPC .. G06F 16/125; G06F 16/113; G06F 21/6245; H04L 63/04; H04L 63/105
(Continued)

(56) References Cited

U.S. PATENT DOCUMENTS 5,274,700 A    12/1993   Gechter et al.
5,526,416 A    6/1996    Dezonno et al.
(Continued)

FOREIGN PATENT DOCUMENTS

DE    1684587 A1    3/1971
EP    0282126 A2    9/1988
(Continued)

OTHER PUBLICATIONS

U.S. Appl. No. 1/793,435, U.S. Pat. No. 9,251,371, filed Jul. 7, 2015, Method and System for Applying Data Retention Policies in a Computing Platform.
(Continued)

*Primary Examiner* — Michael S McNally
(74) *Attorney, Agent, or Firm* — Schwegman Lundberg & Woessner, P.A.

(57) ABSTRACT

Systems and methods for a multitenant computing platform. Original data is generated through operation of a computing platform system on behalf of an account of the computing platform system, and the original data is moderated according to a data retention policy set for the account. The moderated data is stored at the computing platform system. The computing platform system moderates the generated data by securing sensitive information of the generated data from access by the computing platform system, and providing operational information from the generated data. The operational information is accessible by the computing platform system during performance of system operations.

20 Claims, 6 Drawing Sheets

Related U.S. Application Data continuation of application No. 16/280,122, filed on Feb. 20, 2019, now Pat. No. 10,747,717, which is a continuation of application No. 15/826,434, filed on Nov. 29, 2017, now Pat. No. 10,229,126, which is a continuation of application No. 15/412,843, filed on Jan. 23, 2017, now Pat. No. 9,858,279, which is a continuation of application No. 14/974,312, filed on Dec. 18, 2015, now Pat. No. 9,588,974, which is a continuation of application No. 14/793,435, filed on Jul. 7, 2015, now Pat. No. 9,251,371.

(60) Provisional application No. 62/021,645, filed on Jul. 7, 2014.

(58) Field of Classification Search
USPC .......................................................... 726/27
See application file for complete search history.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |

(56) References Cited

U.S. PATENT DOCUMENTS

| | | |
|---|---|---|
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,346,630 B1 | 1/2013 | Mckeown |
| 8,355,394 B2 | 1/2013 | Taylor et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 * | 12/2013 | Nath .............. G06F 21/6209 713/168 |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |

(56) References Cited

U.S. PATENT DOCUMENTS

| | | |
|---|---|---|
| 9,032,204 B2 | 5/2015 | Byrd et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,204,281 B2 | 12/2015 | Ramprasad et al. |
| 9,210,275 B2 | 12/2015 | Lawson et al. |
| 9,251,371 B2 | 2/2016 | Ballai et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,378,337 B2 | 6/2016 | Kuhr |
| 9,456,008 B2 | 9/2016 | Lawson et al. |
| 9,456,339 B1 | 9/2016 | Hildner et al. |
| 9,588,974 B2 | 3/2017 | Ballai et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,858,279 B2 | 1/2018 | Ballai et al. |
| 10,229,126 B2 | 3/2019 | Ballai et al. |
| 10,747,717 B2 | 8/2020 | Ballai et al. |
| 11,341,092 B2 | 5/2022 | Ballai et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |

(56) References Cited

U.S. PATENT DOCUMENTS

| | | |
|---|---|---|
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Balo et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1* | 9/2008 | Hudis .................. G06F 21/552 726/25 |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0018489 A1 | 1/2009 | Babaev |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Ingram et al. |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0022131 A1 | 9/2009 | Chen et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0029191 A1 | 11/2010 | Sanding et al. |
| 2010/0281108 A1 | 11/2010 | Cohen |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |

(56) References Cited

U.S. PATENT DOCUMENTS

| | | |
|---|---|---|
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0014981 A1 | 6/2011 | Koren et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1* | 1/2012 | Li .................... G06Q 30/06 726/1 |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1* | 4/2012 | Raichstein .......... G06F 11/1461 707/645 |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0017361 A1 | 7/2012 | Bleau et al. |
| 2012/0170726 A1 | 7/2012 | Schwartz |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0037251 A1 | 12/2014 | Fausak et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0373098 A1 | 12/2014 | Fausak et al. |
| 2014/0379670 A1* | 12/2014 | Kuhr .................... G06F 21/6245 707/692 |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1* | 3/2015 | Yara .................... G06F 16/21 707/667 |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |

(56) References Cited

U.S. PATENT DOCUMENTS

| | | | |
|---|---|---|---|
| 2015/0370788 | A1 | 12/2015 | Bareket et al. |
| 2015/0381580 | A1 | 12/2015 | Graham, III et al. |
| 2016/0001758 | A1 | 1/2016 | Sugio |
| 2016/0004882 | A1 | 1/2016 | Ballai et al. |
| 2016/0011758 | A1 | 1/2016 | Dornbush et al. |
| 2016/0028695 | A1 | 1/2016 | Binder |
| 2016/0077693 | A1 | 3/2016 | Meyer et al. |
| 2016/0103846 | A1 | 4/2016 | Ballai et al. |
| 2016/0112475 | A1 | 4/2016 | Lawson et al. |
| 2016/0112521 | A1 | 4/2016 | Lawson et al. |
| 2016/0119291 | A1 | 4/2016 | Zollinger et al. |
| 2016/0127254 | A1 | 5/2016 | Kumar et al. |
| 2016/0149956 | A1 | 5/2016 | Birnbaum et al. |
| 2016/0162172 | A1 | 6/2016 | Rathod |
| 2016/0205519 | A1 | 7/2016 | Patel et al. |
| 2016/0226937 | A1 | 8/2016 | Patel et al. |
| 2016/0226979 | A1 | 8/2016 | Lancaster et al. |
| 2016/0234391 | A1 | 8/2016 | Wolthuis et al. |
| 2016/0239770 | A1 | 8/2016 | Batabyal et al. |
| 2017/0132233 | A1 | 5/2017 | Ballai et al. |
| 2017/0339283 | A1 | 11/2017 | Chaudhary et al. |
| 2018/0081888 | A1 | 3/2018 | Ballai et al. |
| 2019/0258605 | A1 | 8/2019 | Ballai et al. |
| 2020/0301879 | A1 | 9/2020 | Ballai et al. |
| 2022/0309036 | A1 | 9/2022 | Ballai et al. |

FOREIGN PATENT DOCUMENTS

| | | | |
|---|---|---|---|
| EP | 1464418 | A1 | 10/2004 |
| EP | 1522922 | A2 | 4/2005 |
| EP | 1770586 | A1 | 4/2007 |
| EP | 2053869 | A1 | 4/2009 |
| ES | 2134107 | A1 | 9/1999 |
| JP | 10294788 | A | 11/1998 |
| JP | 2004166000 | A | 6/2004 |
| JP | 2004220118 | A | 8/2004 |
| JP | 2006319914 | A | 11/2006 |
| WO | WO-9732448 | A1 | 9/1997 |
| WO | WO-2002087804 | A1 | 11/2002 |
| WO | WO-2006037492 | A1 | 4/2006 |
| WO | WO-2009018489 | A2 | 2/2009 |
| WO | WO-2009124223 | A1 | 10/2009 |
| WO | WO-2010037064 | A1 | 4/2010 |
| WO | WO-2010040010 | A1 | 4/2010 |
| WO | WO-2010101935 | A1 | 9/2010 |
| WO | WO-2011091085 | A1 | 7/2011 |

OTHER PUBLICATIONS

U.S. Appl. No. 14/974,312, U.S. Pat. No. 9,588,974, filed Dec. 18, 2015, Method and System for Applying Data Retention Policies in a Computing Platform.

U.S. Appl. No. 15/412,843, U.S. Pat. No. 9,858,279, filed Jan. 23, 2017, Method and System for Applying Data Retention Policies in a Computing Platform.

U.S. Appl. No. 15/826,434, U.S. Pat. No. 10,229,126, filed Nov. 29, 2017, Method and System for Applying Data Retention Policies in a Computing Platform.

U.S. Appl. No. 16/280,122, U.S. Pat. No. 10,747,717, filed Feb. 20, 2019, Method and System for Applying Data Retention Policies in a Computing Platform.

U.S. Appl. No. 16/894,341, filed Jun. 5, 2020, Method and System for Applying Data Retention Policies in a Computing Platform.

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.

"U.S. Appl. No. 14/793,435, Notice of Allowance dated Oct. 7, 2015", 10 pgs.

"U.S. Appl. No. 14/974,312, Examiner Interview Summary dated Sep. 30, 2016", 3 pgs.

"U.S. Appl. No. 14/974,312, Non Final Office Action dated Jul. 19, 2016", 13 pgs.

"U.S. Appl. No. 14/974,312, Notice of Allowance dated Oct. 21, 2016", 8 pgs.

"U.S. Appl. No. 14/974,312, Response filed Oct. 5, 2016 to Non Final Office Action dated Jul. 19, 2016", 6 pgs.

"U.S. Appl. No. 15/412,843, Non Final Office Action dated Jun. 26, 2017", 22 pgs.

"U.S. Appl. No. 15/412,843, Notice of Allowance dated Aug. 30, 2017", 8 pgs.

"U.S. Appl. No. 15/412,843, Preliminary Amendment filed Feb. 21, 2017", 5 pgs.

"U.S. Appl. No. 15/412,843, Response filed Jul. 28, 2017 to Non Final Office Action dated Jun. 26, 2017", 5 pgs.

"U.S. Appl. No. 15/826,434, Non Final Office Action dated Jul. 10, 2018", 12 pgs.

"U.S. Appl. No. 15/826,434, Notice of Allowance dated Oct. 31, 2018", 8 pgs.

"U.S. Appl. No. 15/826,434, Response filed Sep. 26, 2018 to Non Final Office Action dated Jul. 10, 2018", 6 pgs.

"U.S. Appl. No. 16/280,122, Non Final Office Action dated Mar. 16, 2020", 13 pgs.

"U.S. Appl. No. 16/280,122, Notice of Allowance dated Apr. 14, 2020", 8 pgs.

"U.S. Appl. No. 16/280,122, Preliminary Amendment filed May 8, 2019", 7 pgs.

"U.S. Appl. No. 16/280,122, Response filed Apr. 1, 2020 to Non Final Office Action dated Mar. 16, 2020", 8 pgs.

"U.S. Appl. No. 16/894,341, Non Final Office Action dated Oct. 25, 2021", 18 pgs.

"U.S. Appl. No. 16/894,341, Notice of Allowance dated Feb. 18, 2022", 8 pgs.

"U.S. Appl. No. 16/894,341, Response filed Feb. 1, 2022 to Non Final Office Action dated Oct. 25, 2021", 8 pgs.

"Archive Microsoft Office 365 Email | Retain Unified Archiving", GWAVA, Inc., Montreal, Canada, [Online] Retrieved from the Internet: <URL: http://www.gwava.com/Retain/Retain for_Office_365.php>, (2015), 4 pgs.

"Complaint for Patent Infringement", Telinit Technologies, LLC v. Twilio Inc 2:12-cv-663, (Oct. 12, 2012), 17 pgs.

"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.

"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

(56) References Cited

OTHER PUBLICATIONS

"U.S. Appl. No. 17/806,877, Non Final Office Action dated Jan. 27, 2023", 25 pgs.

* cited by examiner

METHOD AND SYSTEM FOR APPLYING DATA RETENTION POLICIES IN A COMPUTING PLATFORM

CROSS-REFERENCE TO RELATED APPLICATIONS

This application is a continuation of U.S. patent application Ser. No. 16/894,341, filed 5 Jun. 2020, which is a continuation of U.S. patent application Ser. No. 16/280,122, filed 20 Feb. 2019, which is a continuation of U.S. patent application Ser. No. 15/826,434, filed 29 Nov. 2017, which is a continuation of U.S. patent application Ser. No. 15/412,843, filed 23 Jan. 2017, which is a continuation of U.S. patent application Ser. No. 14/974,312, filed 18 Dec. 2015, which is a continuation of U.S. patent application Ser. No. 14/793,435, filed 7 Jul. 2015, which claims the benefit of U.S. Provisional Application Ser. No. 62/021,645, filed on 7 Jul. 2014, all of which are incorporated in their entirety by this reference.

TECHNICAL FIELD

This invention relates generally to the data management field, and more specifically to a new and useful method and system for applying data retention policies in the data management field.

BACKGROUND

Data analytics are an important part of running a data driven computing platform. However, there are many cases where the data is inappropriate for storage. In some cases, the information is sensitive and an operator would not want to store such information. Storing such information may violate the trust of involved parties or create an information liability. In some cases, the data cannot be stored to maintain compliance with regulations. For example, personal medical information may not be allowed to be stored when building a HIPAA compliant application. Thus, there is a need in the data management field to create a new and useful method and system for applying data retention policies in a computing platform. This invention provides such a new and useful method and system.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. METHOD

Figure 1:
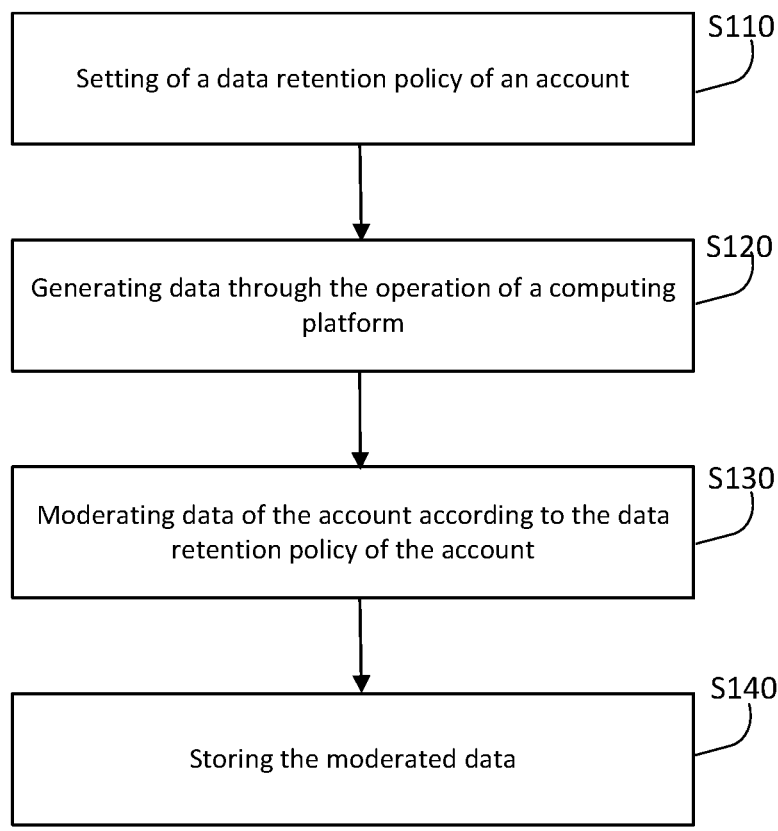
FIG. 1 is a flow diagram of a method of a preferred embodiment.

As shown in FIG. 1, a method for controlling data of a preferred embodiment can include setting of a data retention policy of an account S110, generating data through the operation of a computing platform S120, moderating data of the account according to the data retention policy of the account S130, and storing the moderated data S140. The method functions to provide a mechanism through which a data-driven computing platform can accommodate a wide variety of data retention polices while serving number of different accounts. The method may be used to define how data is stored long term. Additionally or alternatively, the method may be used to provide data "deletion" capabilities to an account wherein the operational significance of the data is preserved for other parties (e.g., a computing platform operator). The method is preferably used in a multi-tenant computing platform, wherein each account, sub-account or other data scope may have individually assigned data retention polices.

The computing platform is preferably data-driven in the sense that the accumulation of data is used in subsequent processes of the platform—at least one operational aspect depends on accurate and exhaustive collection of data. In one case the data of the computing platform is metered/measured for each account and used in regulating usage of an account. In computing platform where the usage is a factor of billing, the data history for an account must be accurate to calculate fees. One objective of the method is to enable such data-driven behavior, while simultaneously enabling data protection that may otherwise conflict with the notion of metering usage.

In one particular implementation, the computing platform is a communication platform and more specifically a communication application platform such as the one described in U.S. Pat. No. 8,306,021, issued 6 Nov. 2012, which is incorporated in its entirety by this reference. A communication platform may have complicated billing models that can depend on the count of communications, the source and/or destination of communication, the type of communication, the duration of communication, the events and media processes associated with the communication (e.g., text to speech services, speech detection services, transcription services, recording services, etc.), rate and threshold billing variables, and other suitable factors. Such complicated billing models may preclude the on-demand calculation of itemized billing per communication or data record. The method can address the requirement of accounting while preserving the data in a private manner. Herein, the communication platform may be used as an exemplary platform, but any suitable computing platform may similarly apply the method for controlling data.

Block S110, which includes setting of a data retention policy of an account S110, functions to receive a signal that defines how at least a subset of data should be retained with the system. A data retention policy is preferably set by an account holder. The data retention policy is preferably received from the account holder. In one variation, the data retention policy is pre-defined. The policy retention policy could be globally pre-set for all data generated in association with the account. The policy retention policy may alternatively be defined for a sub-set of account data. For example, a policy retention policy may be mapped to a sub-account of the account, to a type of data (e.g., data generated during a voice communication or data generated during a message communication), or any suitable data scope. For example, data associated with SMS and MMS messaging may not be set for "deletion" while voice communication data is kept in an original format. Similarly, the data retention policy for communication with a first endpoint (e.g., phone number) may be different for data retention policies for a second endpoint. In one variation, an administrator of an account may specify the data retention policy/policies through an administrator control panel user interface. In another variation, the data retention policy may be set in response to a developer API request. A data retention policy may alternatively be defined in any suitable manner.

Data retention policy may additionally or alternatively be specified on-demand. The data retention policy can be defined in directives during operation of the computing platform. In the communication platform implementation, a data retention policy may be selectively changed for part or all of a call. The data retention policy directives may provide commands to initiate pause, end, or otherwise change the data retention policy. A data retention policy may be initiated in a first instance and then terminated in a second instance. Any data generated or associated with the time period between the first and second instances is preferably processed according to the data retention policy. Data outside of those two instances may be processed according to the default data retention policy or any original data retention policy. In one example, a user may be placing a call to a banking customer support phone system. While most of the communicated information is not sensitive data, a portion of the call may require the customer to enter personal information such as a credit card. The data retention policy may be elevated to a higher level of data protection during this process to prevent such data being retained and accessible in data logs.

Additionally or alternatively, a specific request to apply data retention to one or more data elements may be received and processed. In this variation, specific data records can be selectively targeted for particular data retention policy compliance.

A data retention policy preferably defines actions to take on data prior to storing or warehousing the data. In one variation, there are preferably at least two data retention policies. A first data retention policy is a passive data retention policy that preserves the data in an original and raw format. Such a data retention policy is preferably a default data retention policy, and no action is preferably taken on the data. The passive data retention policy can alternatively be described as a lack of a data retention policy. The other forms of data retention policy are preferably transformative data retention policies that result in some change or transformation of the data. A transformative data retention policy preferably removes or secures sensitive information while creating some mechanism through which the computing platform can accomplish data-driven operations.

A transformative data retention policy will preferably take some form of a data retention action on the data during moderation of the data. A data retention action can include data redaction/censoring, data classifying/bucketing, data aggregating, data encryption, partial deletion, and/or any suitable approach to data protection. Within the computing platform varying levels of data retention policies may be defined wherein different levels of data retention may have differing degrees of data destruction/preservation. Additionally, different forms of data transformation may be applied to different data fields. In a computing platform, the data stored may follow a substantially defined schema and the forms of transformations that should be applied can be customized for each field. For example, some fields may not be used for data-driven processes and can be deleted, while other fields may be suitable for a form of redaction, while other fields may be better suited for data classifying or bucketing.

A transformative data retention policy may additionally include one or more defined temporal properties. One temporal property may define how long the data may be retained before the data is moderated and transformed. One account may maintain the original raw data for 30 days and after 30 days transform the data. Another account may have no temporary need for the data and transform data directly after completing active use (e.g., during initial warehousing of the data). A second temporal property may be a backup time window that defines how long the original data is preserved in addition to the transformed data before deletion. In this variation, the method enables the capability to undo or reverse the transformation of a data retention policy. For example, a backup time window property for one account of 24 hours will allow any data transformation or deletion request to be undone for up to 24 hours. In one implementation, deleted or transformed data may be shown in a special folder within an administrator control panel until the time window is up. In another example, a backup time window property for another account can be set to zero seconds, and any data transformations or deletion requests are effective immediately and cannot be reversed.

The interface through which a data retention policy is received can be through an Application Program Interface, a configuration file, a user interface (e.g., in an administrator control panel), or any suitable interface. The manner in which a data retention policy is defined may be achieved through various approaches. In a first variation, a transformative data retention policy can be selected from a set of offered transformative data retention policy options. For example, an account may be able to set up an application within a communication application platform, and in the settings of that application select a default of no data transformations, a pre-defined redaction process, or a custom encryption data retention process. In another variation, a data retention policy may be specifically defined. A schema or configuration file may be provided that defines how data retention should be applied. The data retention can be specified specifically for different data attributes. Particular types of data retention actions may be directed to particular data types, data conditions (e.g., if a data field satisfies a specified condition enact a data retention action), data fields, or other suitable aspects. Alternatively, any suitable approach may be used to define the data retention policy. In another variation, the type of data retention policy may be defined based on the type of account.

Block S120, which includes generating data through the operation of a computing platform S120, functions to produce data within a system. The data produced is preferably data produced as a result of the accounts, users, or other entities using the multi-tenant computing platform. The data can be data logs, API request/response records, captured packets (PCAP files), form data input, user generated data, generated or obtained media (e.g., audio, images, video, etc.), and/or any suitable type of data. The data may be accessible to an account holder for any suitable use. For example, a customer support phone system built in a communication application platform may include event logs that include meta data about the calling phone number, the called phone number, the duration of the call, media recordings made during the call, DTMF input, and other suitable information. An account holder is preferably a developer account or administrator account, which may build different analytics or tools that leverage a portion of the generated data. For example, a history of a customer support agent could be generated by polling the data source of the communication application platform. Since the computing platform may be built as a general set of functionality to serve a wide variety of parties, there may be particular use cases to which this data logging behavior is not ideal or possibly prohibitive. For example, if phone system builds a tool where users enter their social security number, the data logs will automatically create a record of callers' social security numbers. The administrator of this system may not want to be liable for having access to such sensitive data. In another example, a health care system may end up storing personal identifiable information in the data, which may cause HIPAA compliance issues and so such automatic data logging may ordinarily prevent such a use case. The method of the preferred embodiment can preferably address such scenarios.

While the data generated may be the result of building a generic tool, the computing platform may additionally partially depend on information of the data. The computing platform in which the data is generated may be an at least partially closed system with operations that are outside of the control or direction of an account holder—there are preferably components of the computing platform to which an account holder/user of the platform will not have visibility. The computing platform is preferably multitenant, wherein multiple account holders will share the use of the computing platform while maintaining distinct and substantially independent applications/services. The partially closed portions of the platform can include the system orchestration system, usage/analytics tools, billing engine, business intelligence tools, a platform operations system (e.g., the platform operations system 270 of FIG. 2) and/or any suitable system. In some implementations, the platform operations system performs at least one of platform orchestration, usage metering, analytics, billing, and business intelligence. In some implementations, the platform operations system performs usage/analytics. Such system (or systems) can depend on the data generated in connection with an account holder. The data retention policy management method described herein may function to enable data protection without hindering or preventing such operations.

The data generated may have different stages in the data life cycle. The data is preferably generated as a result of some event relating to an account, sub-account, user action of an application, service action, or other suitable event. The data may have a period of being in-flight wherein inflight data is actively stored for use within some operation. For example, data generated during a phone call may be in-flight for the duration of the call. An SMS or MMS message may have in-flight data for the duration to complete transmission. Alternatively, there may be a concept of a conversation wherein the data is in-flight for the duration of the messaging conversation. After active use, the data may be moved to a temporary storage system prior to being transmitted for data warehousing. Data warehousing will preferably be used to store the data for long duration. It is between in-flight state and the data warehousing that blocks S130 preferably occurs, but Block S130 may alternatively occur at any suitable time. The data may additionally or alternatively include any alterative states.

Block S130, which includes moderating data of the account according to the data retention policy of the account, functions to exercise the actions defined by the data retention policy. As described above, the data retention policy is preferably exercised after active use and prior to long term storage for data records. The data retention policy may alternatively be applied to any new data records at a periodic interval, be applied immediately as data is generated, or at any suitable time. The conditions in which the data retention policy is exercised are preferably dependent on the data retention policy configuration of an account. More generally, the moderation of the data depends on the data retention policy defined for the data scope (e.g., sub-account data, user data, etc.). In the case where the data retention policy is to take no action, then the data is preferably stored in a raw and unaltered state. In the case where the data retention policy is a transformative data retention policy, the data will be augmented according to the defined actions. There may be different variations on how data is augmented or moderated. Some preferred variations might include data redaction processing, data classifying, data aggregating, data encrypting, partially deleting, and/or any suitable approach to data protection.

Redaction processing functions to remove elements of the data that are sensitive. The redaction processing can effectively censor data so as to put it in a form suitable for storage. Redaction processing additionally can preserve a subset of the data content. Preferably, the information in the data that is desired by the computing platform can be preserved while a subset or all of the remaining data is removed. Redaction processing is preferably applied to data fields or properties where the semantics or pattern of the data is understood sufficiently to differentiate between what should be kept and what should be removed. In one case, phone numbers may be an element of a data record. Phone numbers may provide personally identifying information as they often map back to an individual. However, a communication platform may depend on knowing the country and area codes of phone numbers during billing of an account. Accordingly, the country and area code are preferably preserved while the remaining four digits are censored. In one variation, redaction processing may include automatically detecting a pattern and applying censorship to the pattern. Automatic detection may be useful in situations where a fixed rule cannot be defined to specify where and when content will need to be augmented. Credit card numbers, social security numbers, and account numbers, addresses, and other suitable forms of information may be detected and automatically removed from the data. Such type of content may appear in various places, when data matches those patterns it may be automatically removed.

Data classifying functions to abstract or bucket the data content to remove details of the original information. The data classifying preferably includes abstracting up the level of information in the original data. One approach is to classify content into a higher-level abstraction. For example, geo-location data may be generalized from precise geo-location data to general location information such as zip code, region, city, state or country. As another alternative, data metrics may be bucketed from precise measurements into ranges. For example, a data metric measuring the duration of a call may be changed from second-level precision to minute level precision.

Data aggregating functions to create a distinct data record that is the cumulative combination of previous data records. The precise metrics of a data record can be maintained but only in combination with a set of other data records. The individual metric is preferably deleted or censored. For example, the total duration of a phone call may be aggregated into total duration of all phone calls for an account, however the duration of the individual call cannot normally be obtained.

Encrypting data functions to cryptographically transform the data. Encrypting data preferably depends on an account-defined key. Encrypting data preferably includes receiving an encryption callback reference, determining the data content to be encrypted, transmitting the original content to the encryption callback reference (e.g., the encryption callback 281 of FIG. 2), receiving encrypted data content and using the encrypted data content in place of the original content. The encryption callback reference is preferably a callback URI operated by the account holder. HTTP, SPDY, or any suitable application layer protocol may be used to communicate the original data to the callback URI. The account holder will receive the original data and can use a self-defined encryption algorithm and key to encrypt the data, which is then returned for storage. The encryption allows only the account holder to access the contents of the data. Encryption can be used if the data should be secured but not deleted permanently. Encryption may be used in combination with redaction classification, aggregation, or any suitable data transformation. Redaction, classification, and aggregation may enable system dependent information to be preserved while removing sensitive data. For example, if phone numbers are encrypted, the account holder may be able to decrypt the encrypted version to view the data. However, since a communication application platform may depend on the country and area code of that data, a redacted copy of that data property may additionally be stored.

A data augmentation may additionally include a partial deletion of data, wherein some data fields or whole data records may be deleted. Some subset of data types or data parameters may be fully deletable. Such fields may include customer defined data fields (e.g., data tags or metadata).

Block S140, which includes storing the moderated data, functions to store the moderated data. The moderated data can be stored in any suitable manner. As described above, for encrypted data. A second form of data transformation may be stored for some all parts of the encrypted data. The stored moderated data may be used for various system operations such as scaling infrastructure, metering account usage, billing for account usage, informing business decisions, acquiring assets, or any suitable data-driven decision. The policy transformed data is preferably applied to any location where data is stored such as in a data warehouse, log files, media records, and/or any suitable location.

The method can additionally facilitate various data related functionality. Such functionality may be enabled on secured data despite the original data being too sensitive to normally allow such functionality. As a primary functionality, account usage and analytics can be provided. Data aggregation, classification, and selective redaction can preserve some level of information that can provide insight into patterns. Such data preservation may additionally be applied to enable fraud detection, error detection, or general event pattern detection. Within the computing platform, the data information may be used in making decisions related to platform administration, orchestrating a cluster or distributed computing system, allocating/deallocating resource, pricing, and/or other operational factors of the computing platform. The systematic approach to data retention policies may additionally provide an audit trail of data management for an account, which can be used to show data compliance in various situations.

Figure 2:
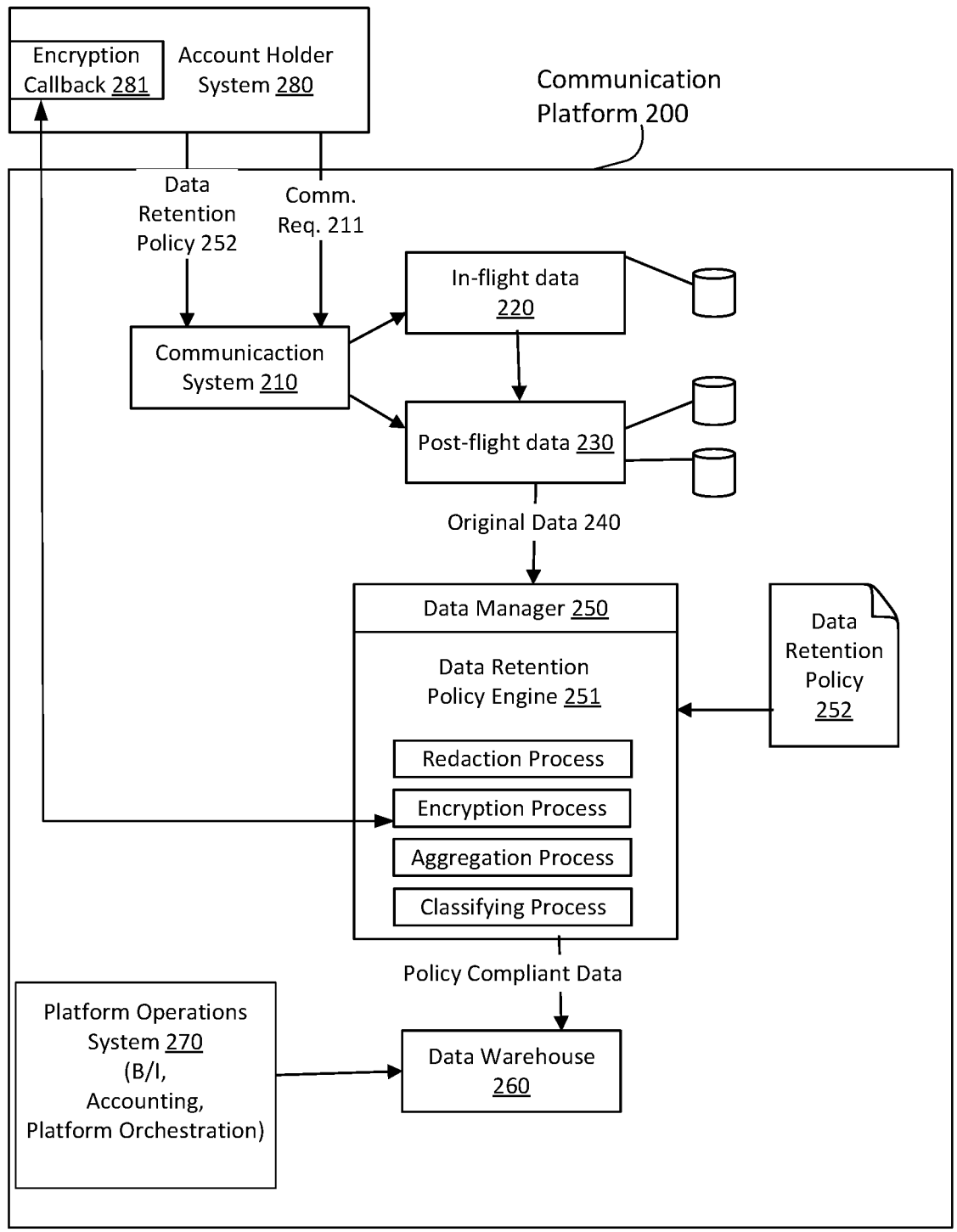
FIG. 2 is a schematic representation of an exemplary implementation of a preferred embodiment.

In one preferred implementation, the method is applied to a communication platform that can facilitate synchronous communication such as voice, video, screen sharing, virtual reality and/or any suitable media stream. The synchronous communication may use PSTN, SIP, WebRTC, IP-based protocols, or any suitable communication protocols. The communication platform may additionally or alternatively facilitate asynchronous communication such as SMS, MMS, or IP based messaging. As shown in FIG. 2, a communication (e.g., a communication requested by the communication request 211 of FIG. 2) will be executed on the communication platform (e.g., by the communication system 210 of FIG. 2). Various events during the communication such as the communication request, media generated during the communication, input received during the communication (e.g., DTMF input), and a summary of the communication after it completes may all be exemplary data records generated (e.g., by the communication system 210 of FIG. 2) in association with the communication. While the communication is active, the data is preferably stored in in-flight data storage (e.g., the in-flight data storage 220 of FIG. 2) (e.g., active data storage). Data may be mutable and possibly incomplete at this state. Once the call is completed, the associated data may be moved to a post-flight data storage system (e.g., the post-flight data storage 230 of FIG. 2). The post-flight data storage functions as a temporary data storage solution prior to being moved to a data warehousing solution (e.g., the data warehouse system 260 of FIG. 2). The post flight data storage may additionally provide faster real-time data information for particular use-cases. Periodically (based on a time period or satisfying some condition), the post-flight data is onboarded into the data warehousing system (e.g., the data warehouse system 260 of FIG. 2). A data retention policy engine (e.g., the data retention policy engine 251 of the data manager 250 of FIG. 2) preferably facilitates the onboarding process by exercising data retention policies (e.g., the data retention policy 252 of FIG. 2) that are assigned to the various data records. Data for an account that lacks a defined data retention policy will be onboarded with no transformation. Data for an account that has a transformation data retention policy will be transformed according to the data retention policy.

In one example, form of a data retention policy a call record may have the following actions applied call record fields: the "to" field is redacted to exclude last four digits, the "from" field is redacted to exclude last four digits, application URL field is deleted, duration field is bucketed into five minute buckets, time field is bucketed to only show events by hour, associated account identifier is kept, and a price field is deleted or bucketed. A location field may be abstracted to only show city information. Call recordings may be deleted or encrypted through an account controlled cryptographic key.

In some implementations, the communication platform includes the communication system 210, the in-flight data storage 220, the post-flight data storage 230, the data manager 250, the data retention policy engine 251, the data warehouse 260, the data retention policy 252, and the platform operations system 270, and the account holder system 280 is external to the communication platform.

In some implementations, the communication platform (e.g., the communication platform 200 of FIG. 2) includes the communication system 210, the in-flight data storage 220, the post-flight data storage 230, the data manager 250, the data retention policy engine 251, the data warehouse 260, the data retention policy 252, and the platform operations system 270, and the account holder system 280. In some implementations, the platform operations system 270 is external to the communication platform. In some implementations, the data warehouse system 260 is external to the communication platform. In some implementations, the data retention policy engine 251 is constructed to perform redaction, data classifying, data aggregating, and encrypting. In some implementations, the data warehouse system 260 is included in an account holder system (e.g., the account holder system 280), and the communication platform includes information to access data in the data warehouse system 260.

2. MULTI-TENANT COMPUTING PLATFORM SYSTEM

Figure 3:
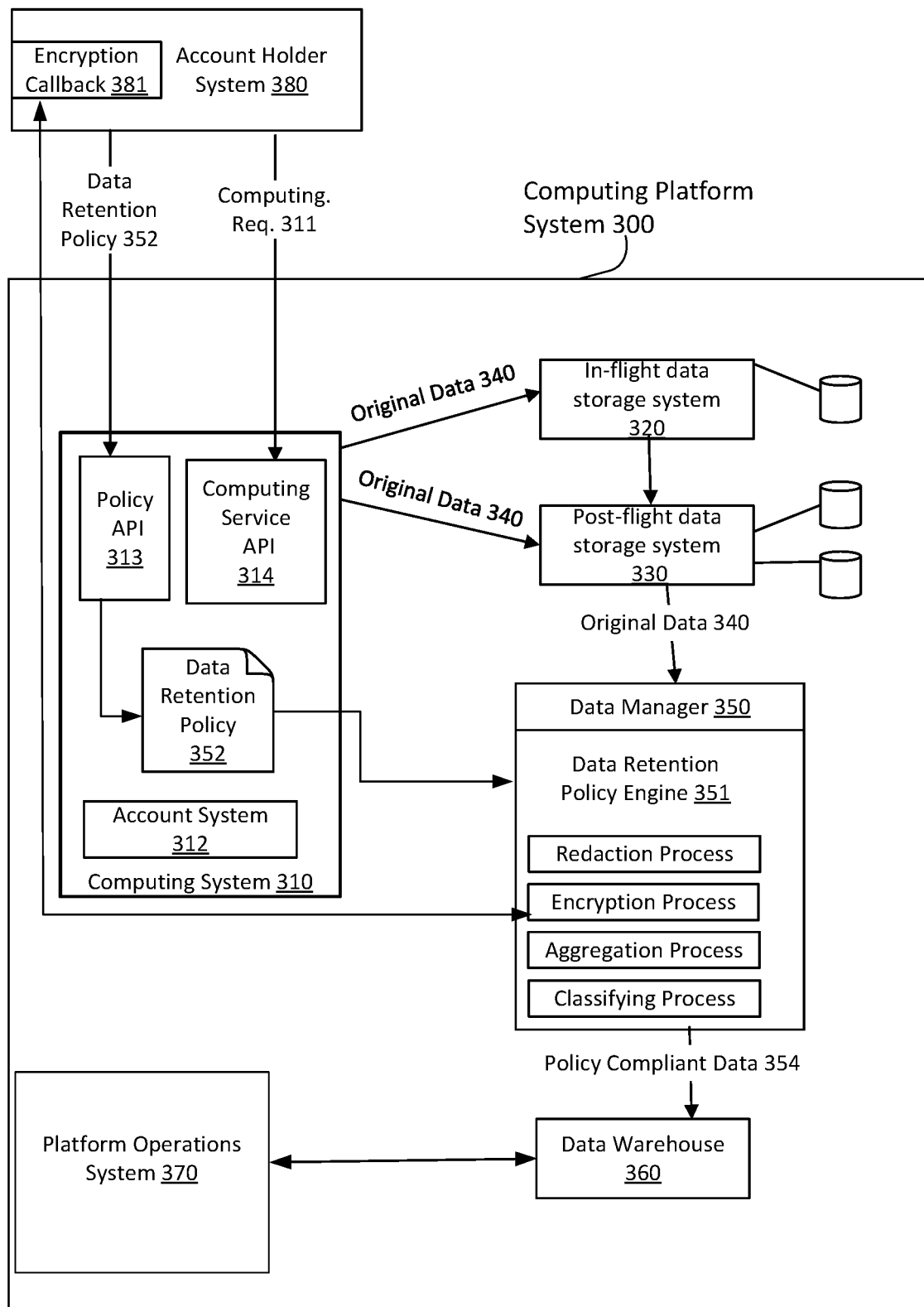
FIG. 3 is a schematic representation of an exemplary implementation of a preferred embodiment.

As shown in FIG. 3, a multi-tenant computing platform system 300 includes a computing system 310, an in-flight data storage system 320, a post-flight data storage system 330, a data manager 350, a data retention policy engine 351, a data warehouse system 360, and a platform operations system 370. The account holder system 380 is external to the computing platform 300. The computing system 310 includes an accounting system 312, a data retention policy API 313, and a computing service API 314.

In some implementations, the computing platform system 300 includes the account holder system. In some implementations, the platform operations system is external to the computing platform system. In some implementations, the data warehouse system is external to the computing platform system. In some implementations, the data retention policy engine is constructed to perform redaction, data classifying, data aggregating, and encrypting. In some implementations, the data warehouse system is included in an account holder system (e.g., the account holder system 380), and the computing platform system includes information to access data in the data warehouse system.

In some implementations, the computing platform system 300 is similar to the computing platform described above for FIG. 1. In some implementations, the in-flight data storage system 320 is similar to the in-flight data storage 220 of FIG. 2. In some implementations, the post-flight data storage system 330 is similar to the post-flight data storage 230 of FIG. 2. In some implementations, the data manager 350 is similar to the data manager 250 of FIG. 2. In some implementations, the data retention policy engine 351 is similar to the data retention policy engine 251 of FIG. 2. In some implementations, the data warehouse system 360, is similar to the data warehouse system 260 of FIG. 2. In some implementations, the platform operations system 370 is similar to the platform operations system 270 of FIG. 2.

The system 300 is communicatively coupled to the external system 380 via the data retention policy API 313 and the computing service API 314 of the computing system 310.

In the embodiment of FIG. 3, the external system 380 is a system of an account holder of an account (e.g., an account of the account system 312) of the computing platform system 300. In some implementations, external systems include a system of an application developer that provides an application to users of the external system. In some implementations, external systems include a system of a service provider that provides a service to users of the external system. In some implementations, external systems include a communication endpoint.

In some implementations, the computing system 310, the in-flight data storage system 320, the post-flight data storage system 330, the data manager 350, the data retention policy engine 351, the data warehouse system 360, and the platform operations system 370 are implemented as a server device. In some implementations, the computing system 310, the in-flight data storage system 320, the post-flight data storage system 330, the data manager 350, the data retention policy engine 351, the data warehouse system 360, and the platform operations system 370 are implemented as a plurality of server devices communicatively coupled to each other (e.g., a computing cluster).

The computing system 310 functions to provide any suitable computing service (e.g., a service provided via the computing service API 314).

In some implementations, the computing system 310 includes an account system (e.g., 312), which functions to allow distinct accounts to use the computing system 310. An account is preferably operated by a developer or application provider that builds an application or service that utilizes the computing system 310. For example, in an implementation in which the computing system 310 is a communication system, an account holder of an account may build a call center application that uses the computing system 310 to direct customers to customer service representatives. Alternatively, the account holder of an account may be an end user of an endpoint (e.g., phone number or SIP address) that uses the computing system 310 to provide some service. For example, an end user may use the computing system 310 to dynamically direct incoming calls to ring multiple destinations until the first device picks up. Any suitable account hierarchy or division may be used. For example, an account may include subaccounts, which run different instances of an application with unique configuration. The accounts additionally have specific authentication credentials. API requests and communication is preferably scoped to a particular account. Accordingly, a data retention policy provided by one account can be stored and associated with the account.

The data retention policy API 313 is preferably a set of data retention policy API calls and/or resources that can be used in the setting, editing, and reading of one or more data retention policies. In some implementations, an account is preferably limited with privileges to interacting with data retention policies associated with the account.

The data retention policy API 313 is preferably part of a RESTful API but may alternatively be any suitable API such as SOAP or custom protocol. The RESTful API works according to an HTTP request and response model. HTTP requests (or any suitable request communication) to the computing platform 300 preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can include various resources, which act as API endpoints, which act as a mechanism for specifying requested information or requesting particular actions. The resources can be expressed as URI's or resource paths. The RESTful API resources can additionally be responsive to different types of HTTP methods such as GET, PUT, POST and/or DELETE.

3. METHOD OF FIG. 4

Figure 4:
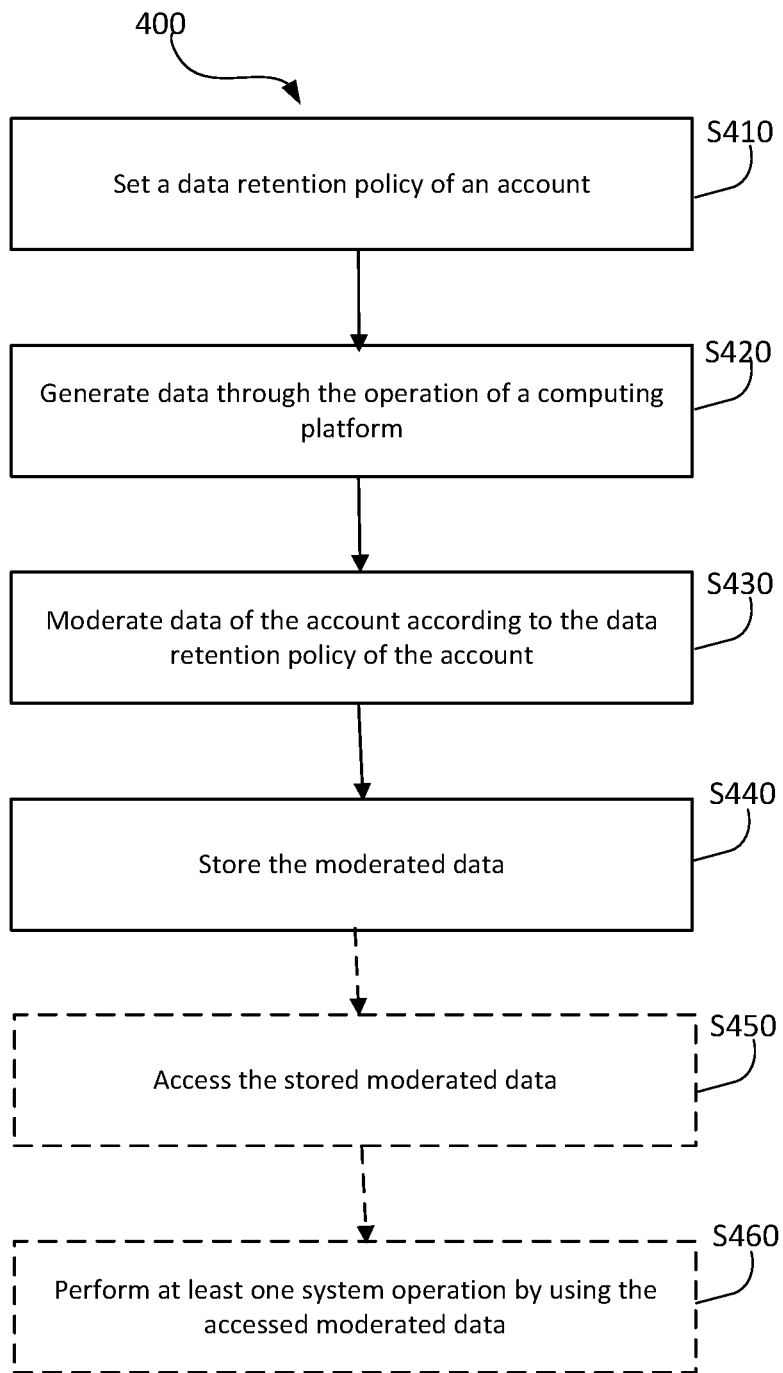
FIG. 4 is a flow diagram of a method of a preferred embodiment.

The method 400 of FIG. 4 includes setting a data retention policy (e.g., 352 of FIG. 3) of an account (e.g., an account of the account holder system 380) at the computing platform system (e.g., the system 300) (process S410); generating data (e.g., the original data 340) through operation of the computing platform system (e.g., 300) on behalf of the account (process S420); moderating the generated data of the account according to the data retention policy of the account (process S430); and storing the moderated data (e.g., the policy compliant data 354 of FIG. 3) (process S440). The computing platform system moderates the generated data by: securing sensitive information of the generated data (e.g., 340) from access by the computing platform system (e.g., 300); and providing operational information from the generated data, the operational information being accessible by the computing platform system (e.g., 300) during performance of system operations (e.g., by the platform operations system 370).

In some implementations, the moderated data is stored at a data warehouse system (e.g., 360 of FIG. 3).

In some implementations, the method 400 includes: accessing, at the computing platform system (e.g., 300) (e.g., by using the platform operations system 370) the moderated data (e.g., 354) stored at the data warehouse system (e.g., 360) (process S450); and performing (e.g., by using the platform operations system 370) at least one system operation by using the accessed moderated data (process S460). In some implementations, system operations include at least one of usage analytics, business intelligence operations, infrastructure scaling operations, metering account usage, billing for account usage, fraud detection, error detection, general event pattern detection, platform administration operations, allocating resources, deallocating resources, cluster management operations, and auditing operations.

In some implementations, the multi-tenant computing platform system 300 performs the processes S410-S440. In some implementations, the multi-tenant computing platform system 300 performs the process S450. In some implementations, the multi-tenant computing platform system 300 performs the process S460.

In some implementations, the computing system 310 performs the process S410. In some implementations, the policy API 313 performs the process S410. In some implementations, the computing system 310 and the policy API 313 perform the process S410. In some implementations, the computing system 310 performs the process S410 responsive to a request received via the policy API 313. In some implementations, the computing system 310 performs the process S410 responsive to a response received via the policy API 313.

In some implementations, the computing system 310 performs the process S420.

In some implementations, the data retention policy engine 351 performs the process S430.

In some implementations, the data retention policy engine 351 performs the process S440. In some implementations, the data warehouse system 360 performs the process S440. In some implementations, the system 300 stores the moderated data (e.g., the moderated data 354 of FIG. 3) in a storage device (e.g., the storage medium 605 of FIG. 6) of the system 300.

In some implementations, the system 300 stores the data retention policy (e.g., the data retention policy 352 of FIG. 3) in a storage device (e.g., the storage medium 605 of FIG. 6) of the system 300.

In some implementations, the platform operations system 370 performs the process S450. In some implementations, the platform operations system 370 performs the process S460.

In some implementations, the process S410 is similar to the process S110 of FIG. 1. In some implementations, the process S420 is similar to the process S120 of FIG. 1. In some implementations, the process S430 is similar to the process S130 of FIG. 1. In some implementations, and the process S440 is similar to the process S140 of FIG. 1.

3.1 Setting a Data Retention Policy

In some implementations, the process S410 functions to control the multi-tenant computing platform system 300 to set a data retention policy of an account (e.g., an account of the account system 312) at the computing platform system 300. In some implementations, the data retention policy is set as described above for S110 of FIG. 1. In some implementations, the data retention policy is similar to at least one of the data retention policies described above for S110 of FIG. 1.

In some implementations, the computing system 310 receives the data retention policy (e.g., 352) in a data retention policy message provided by an external system (e.g., the external account holder system 380), and responsive to the data retention policy message, the computing system 310 sets the data retention policy (e.g., 352) at the system 300 in association with an account identifier specified by the data retention policy message (e.g., an account of the account holder system 380). In some implementations, the computing system 310 receives the data retention policy (e.g., 352) via the data retention policy API 313.

In some implementations, the computing system 310 receives the data retention policy (e.g., 352) via an administrator control panel user interface provided by the system 300 (e.g., provided to the external account holder system 380).

In some implementations, the computing system 310 accesses a configuration file provided by an external account holder system (e.g., 380), and the configuration file defines the data retention policy 352.

In some implementations, the computing system 310 receives the data retention policy (e.g., 352) by processing a configuration file. In some implementations, the computing system 310 receives the data retention policy (e.g., 352) by processing a configuration file of an account holder of an account at the system 300 (e.g., an account associated with the external system 380).

In some implementations, the data retention policy is specified on-demand. In some implementations, the data retention policy is defined in directives during operation of the computing system 310. The computing system 310 processes such directives which set the data retention policy at the system 300.

In some implementations in which the system 300 is a communication platform system, the data retention policy is selectively changed for part or all of a call, as described above for S110. In some implementations in which the system 300 is a communication platform system, the data retention policy is selectively changed at least a portion of a communication session (e.g., a telephony voice communication) in a manner similar to that which is described above for S110.

In some implementations, the data retention policy (e.g., 352) is received from an external account holder system (e.g., 380), and the policy is received with a request to apply the policy to one or more specified data elements. In some implementations, specific data records are selectively targeted for particular data retention policy compliance. In some implementations, the data retention policy is a transformative data retention policy as described above for S110. In some implementations, the data retention policy is a transformative data retention policy that secures sensitive information while providing the system 300 with information for performing data-driven system operations. In some implementations, the transformative data retention policy defines at least one data retention action to be performed on the data during moderation of the data. In some implementations, the transformative data retention policy defines at least one data retention action to be performed on the data during moderation of the data, and at least one temporal property (e.g., a temporal property as described above for S110).

In some implementations, the computing system 310 sets the data retention policy by storing the data retention policy 352 in a storage medium of the system 300 (e.g., the storage medium 605 of FIG. 6) in association with the account identifier of the data retention policy message. In some implementations, the computing system 310 sets the data retention policy by storing the data retention policy 352 and the account identifier in a data retention policy data structure of the storage medium of the system 300 (e.g., the storage medium 605 of FIG. 6). In some implementations, the computing system 310 sets the data retention policy by storing a data retention policy data structure of the storage medium of the system 300 (e.g., the storage medium 605 of FIG. 6), the data retention policy data structure including the account identifier and a link to a storage location of the data retention policy 352.

3.2 Generating the Data

In some implementations, the process S420 functions to control the multi-tenant computing platform system 300 to generate data (e.g., the original data 340) through operation of the computing platform system (e.g., 300) on behalf of the account (e.g., an account of the account system 312). In some implementations, the process S420 functions to generate data within the system 300. In some implementations, the generated data (e.g., 340) is data that is produced as a result of accounts (of the system 300), users or other entities using the multi-tenant computing platform system 300.

In some implementations, the computing system 310 generates the data (e.g., the data 340) responsive to a computing request (e.g., the computing request 311) provided by an external system (e.g., the account holder system 380) and received by the computing system 310 via the computing service API (Application Program Interface) 314.

In some implementations, the generated data includes at least one of data logs, API request records, API response records, captured packets, form data input, user generated data, generated media, and obtained media.

The data is similar to the generated data described above for S120 of FIG. 1).

3.3 Moderating the Generated Data

In some implementations, the process S430 functions to control the multi-tenant computing platform system 300 to moderate the generated data of the account according to the data retention policy of the account. In some implementations, the data manger 350 receives the generated data (e.g., 340) from the computing system 310. In some implementations, the data manger 350 receives the generated data (e.g., 340) from the in-flight data storage system 320. In some implementations, the data manger 350 receives the generated data (e.g., 340) from the post-flight data storage system 330.

In some implementations, the data manager 350 moderates the received generated data according to the data retention policy 352. In some implementations, the data retention policy engine 351 of the data manger 350 moderates the received generated data according to the data retention policy 352. In some implementations, the data manager 350 receives the policy 352 from the computing system 310. In some implementations, the data manager 350 receives the policy 352 from an external system (e.g., the external account holder system 380). In some implementations, the data manager 350 moderates the data as described for S130 of FIG. 1.

In some implementations, the data retention policy engine 351 stores the data retention policy 352. In some implementations, the data retention policy engine 351 manages the data retention policy 352.

In some implementations, the data manager 350 moderates the received generated data by performing actions defined by the data retention policy 352. In some implementations, actions include at least one of data redaction, data censoring, data classifying, data bucketing, data aggregating, data encryption, and partial deletion.

In some implementations, the data retention policy (e.g., 352) defines actions performed by the computing platform system 300 on the data (e.g., 340) to secure the sensitive information prior to storing the data in a data warehouse (e.g., 360) of the computing platform system, and moderating data includes performing the actions defined by the data retention policy. In some implementations, actions include at least one of data redaction, data censoring, data classifying, data bucketing, data aggregating, data encryption, and partial deletion.

In some implementations, the data manager 350 performs redaction as described above for S130 of FIG. 1. In some implementations, data redaction includes automatically detecting and removing at least one of a credit card number, social security number, account number, and address from the data (e.g., 340).

In some implementations, the data manager 350 performs data classifying as described above for S130 of FIG. 1. In some implementations, data classifying includes replacing data with a generalized representation of the data.

In some implementations, the data manager 350 performs data aggregating as described above for S130 of FIG. 1. In some implementations, data aggregating includes replacing metrics of data with an aggregated representation of the metrics of data.

In some implementations, the data manager 350 performs data encryption as described above for S130 of FIG. 1. In some implementations, data encryption includes determining an encryption callback reference (e.g., 381) for the data, transmitting the data to an external system (e.g., 380) of the encryption callback reference (e.g., 381), and replacing the data (e.g., the original data 340) with encrypted data provided by the external system of the encryption callback reference, wherein the account is an account for the external system (e.g., 380). In some implementations, the encryption allows only an account holder of the account (e.g., an account of the accounting system 312 that corresponds to the data retention policy) to access the encrypted sensitive information.

In some implementations, the data manager 350 performs partial deletion as described above for S130 of FIG. 1.

In some implementations, the data manager 350 moderates the received generated data 340 after active use of the generated data by the computing system 310, and prior to long term storage of the data (e.g., in the data warehouse 360). In some implementations, the data manager 350 moderates newly generated data (e.g., 340) at a periodic interval. In some implementations, the data manager 350 moderates newly generated data (e.g., 340) immediately as the data is generated.

In some implementations, moderating the generated data (process S430) includes securing sensitive information of the generated data (e.g., 340) from access by the computing platform system (e.g., 300); and providing operational information from the generated data, the operational information being accessible by the computing platform system (e.g., 300) during performance of system operations (e.g., by the platform operations system 370). In some implementations, the data manager 350 secures sensitive information of the generated data. In some implementations, the data retention policy engine 351 secures sensitive information of the generated data. In some implementations, the data manager 350 provides the operational information from the generated data. In some implementations, the data retention policy engine 351 provides the operational information from the generated data.

In some implementations, securing sensitive information includes at least one of redacting, removing, censoring and encrypting of the sensitive information of the generated data. In some implementations, the encrypting is performed by using an external system (e.g., the external account holder system 380) associated with the account (e.g., an account of the accounting system 312), and the encrypted sensitive information is secured from access by the computing platform system (e.g., 300).

In some implementations, providing operation information from the generated data includes at least one of: preserving operational information from the generated data, providing a portion of the generated data as operation information, and generating operation information from the generated data.

In some implementations, providing a portion of the generated data includes performing redaction on at least one portion of the generated data, preserving at least one portion of the original data, and providing each preserved portion for storage (e.g., providing each preserved portion to the data warehouse 360). In some implementations, providing a portion of the generated data includes performing data deletion on at least one portion of the generated data, preserving at least one portion of the original data, and providing each preserved portion for storage (e.g., providing each preserved portion to the data warehouse 360). In some implementations, providing a portion of the generated data includes performing data encryption on at least one portion of the generated data, preserving at least one portion of the original data in an unencrypted format, and providing each preserved (unencrypted) portion for storage (e.g., providing each preserved portion to the data warehouse 360).

In some implementations, generating operation information from the generated data includes performing a data classification process as described above for S130 of FIG. 1, and providing data classifications generated by the classification process as the operation information. In some implementations, generating operation information from the generated data includes performing a data aggregation process as described above for S130 of FIG. 1, and providing aggregated data generated by the aggregation process as the operation information.

In some implementations, system operations (e.g., performed by the platform operations system 370) include at least one of usage analytics, business intelligence operations, infrastructure scaling operations, metering account usage, billing for account usage, fraud detection, error detection, general event pattern detection, platform administration operations, allocating resources, deallocating resources, cluster management operations, and auditing operations.

3.4 Storing the Moderated Data

In some implementations, the process S440 functions to control the multi-tenant computing platform system 300 to store the moderated data (e.g., the policy compliant data 354 of FIG. 3). In some implementations, the system 300 stores the moderated data at the data warehouse 360. In some implementations, the system 300 stores the moderated data at a log file storage location of the system 300 (e.g., a storage location of the storage medium 605 of FIG. 6). In some implementations, the system 300 stores the moderated data at a media records storage location of the system 300 (e.g., a storage location of the storage medium 605 of FIG. 6).

3.5 Accessing the Moderated Data

In some implementations, the process S450 functions to control the multi-tenant computing platform system 300 to access the stored moderated data. In some implementations, the platform operations system 370 accesses the stored moderated data. In some implementations, the moderated data is accessed at the data warehouse system 360. In some implementations, the moderated data is accessed at a log file storage location of the system 300. In some implementations, the moderated data is accessed at a media records storage location of the system 300

3.6 Performing System Operations

In some implementations, the process S460 functions to control the multi-tenant computing platform system 300 perform at least one system operation by using the accessed moderated data. In some implementations, the platform operations system 370 performs at least one system operation by using the accessed moderated data. In some implementations, system operations include at least one of usage analytics, business intelligence operations, infrastructure scaling operations, metering account usage, billing for account usage, fraud detection, error detection, general event pattern detection, platform administration operations, allocating resources, deallocating resources, cluster management operations, and auditing operations.

4. METHOD OF FIG. 5

Figure 5:
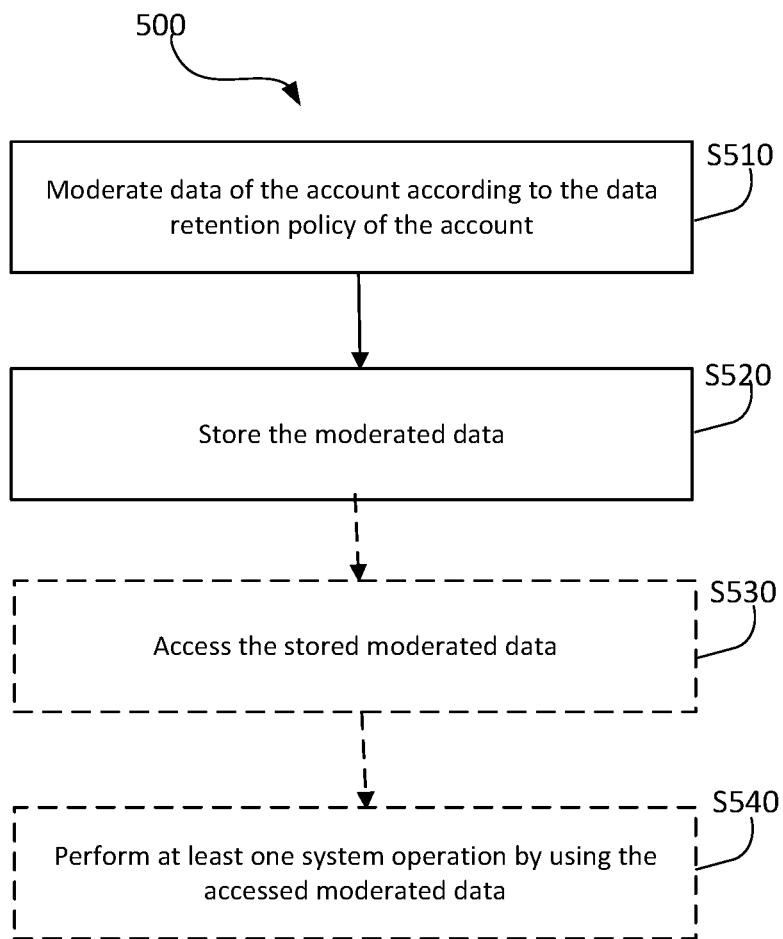
FIG. 5 is a flow diagram of a method of a preferred embodiment.

The method 500 of FIG. 5 includes: moderating original data (e.g., 340) generated through operation of the computing platform system (e.g., generated through operation of the computing system 310) on behalf of an account (e.g., an account of the account system 312) of the computing platform system, the moderating being performed according to a data retention policy (e.g., 352) set for the account (process S510); and storing the moderated data (e.g., 354) at the computing platform system (process S520). The computing platform system (e.g., 300) moderates the generated data (e.g., 340) by: securing sensitive information of the generated data (e.g., 340) from access by the computing platform system (e.g., 300); and providing operational information from the generated data, the operational information being accessible by the computing platform system (e.g., 300) during performance of system operations (e.g., by the platform operations system 370).

In some implementations, the moderated data is stored at a data warehouse system (e.g., 360 of FIG. 3).

In some implementations, the method 500 includes: accessing, at the computing platform system (e.g., 300) (e.g., by using the platform operations system 370) the moderated data (e.g., 354) stored at the data warehouse system (e.g., 360) (process S530); and performing (e.g., by using the platform operations system 370) at least one system operation by using the accessed moderated data (process S540). In some implementations, system operations include at least one of usage analytics, business intelligence operations, infrastructure scaling operations, metering account usage, billing for account usage, fraud detection, error detection, general event pattern detection, platform administration operations, allocating resources, deallocating resources, cluster management operations, and auditing operations.

In some implementations, the multi-tenant computing platform system 300 performs the processes S510-S520. In some implementations, the multi-tenant computing platform system 300 performs the process S530. In some implementations, the multi-tenant computing platform system 300 performs the process S540.

In some implementations, the data retention policy engine 351 performs the process S510. In some implementations, the data manager 350 performs the process S510

In some implementations, the data retention policy engine 351 performs the process S520. In some implementations, the data warehouse system 360 performs the process S520. In some implementations, the system 300 stores the moderated data (e.g., the moderated data 354 of FIG. 3) in a storage device (e.g., the storage medium 605 of FIG. 6) of the system 300.

In some implementations, the method of FIG. 5 is similar to the method of FIG. 4. In some implementations, process S510 is similar to the process S430 of FIG. 4. In some implementations, process S520 is similar to the process S440 of FIG. 4. In some implementations, process S530 is similar to the process S450 of FIG. 4. In some implementations, process S540 is similar to the process S460 of FIG. 4.

In some implementations, the data retention policy is set for the account as described above for the process S410 of FIG. 4. In some implementations, the original data is generated as described above for the process S420.

In some implementations, the data retention policy (e.g., 352) defines actions performed by the computing platform system 300 on the data (e.g., 340) to secure the sensitive information prior to storing the data in a data warehouse (e.g., 360) of the computing platform system, and moderating data includes performing the actions defined by the data retention policy.

In some implementations, the data (e.g., 340) includes at least one of data logs, API request records, API response records, captured packets, form data input, user generated data, generated media, and obtained media.

In some implementations, actions include at least one of data redaction, data censoring, data classifying, data bucketing, data aggregating, data encryption, and partial deletion.

In some implementations, data redaction includes automatically detecting and removing at least one of a credit card number, social security number, account number, and address from the data (e.g., 340). In some implementations, data classifying includes replacing data with a generalized representation of the data. In some implementations, data aggregating includes replacing metrics of data with an aggregated representation of the metrics of data. In some implementations, data encryption includes determining an encryption callback reference (e.g., 381) for the data, transmitting the data to an external system (e.g., 380) of the encryption callback reference, and replacing the data with encrypted data provided by the external system of the encryption callback reference, wherein the account is an account for the external system (e.g., 380).

In some implementations, the computing platform system (e.g., 300) secures the sensitive information from access by the computing platform system (e.g., 300) by performing at least one of removing, censoring and encrypting of the sensitive information of the generated data. In some implementations, the computing platform system provides the operational information from the generated data by at least one of preserving operational information from the generated data and generating operation information from the generated data. In some implementations, the encrypting is performed by using an external system (e.g., 380) associated with the account, and the encrypted sensitive information is secured from access by the computing platform system (e.g., 300).

In some implementations, the encryption allows only an account holder of the account to access the encrypted sensitive information.

In some implementations, system operations include at least one of usage analytics, business intelligence operations, infrastructure scaling operations, metering account usage, billing for account usage, fraud detection, error detection, general event pattern detection, platform administration operations, allocating resources, deallocating resources, cluster management operations, and auditing operations. In some implementations, system operations include at least one of metering account usage, and billing for account usage.

In some implementations, the computing platform system performs at least one system operation by using the operational information. In some implementations, the computing platform system performs at least one system operation by using the stored moderated data. In some implementations, the moderated data is stored at a data warehouse system (e.g., 360), and the computing platform system accesses the moderated data stored at the data warehouse system and performs at least one system operation by using the accessed moderated data.

5. SYSTEM ARCHITECTURE: COMPUTING PLATFORM SYSTEM

Figure 6:
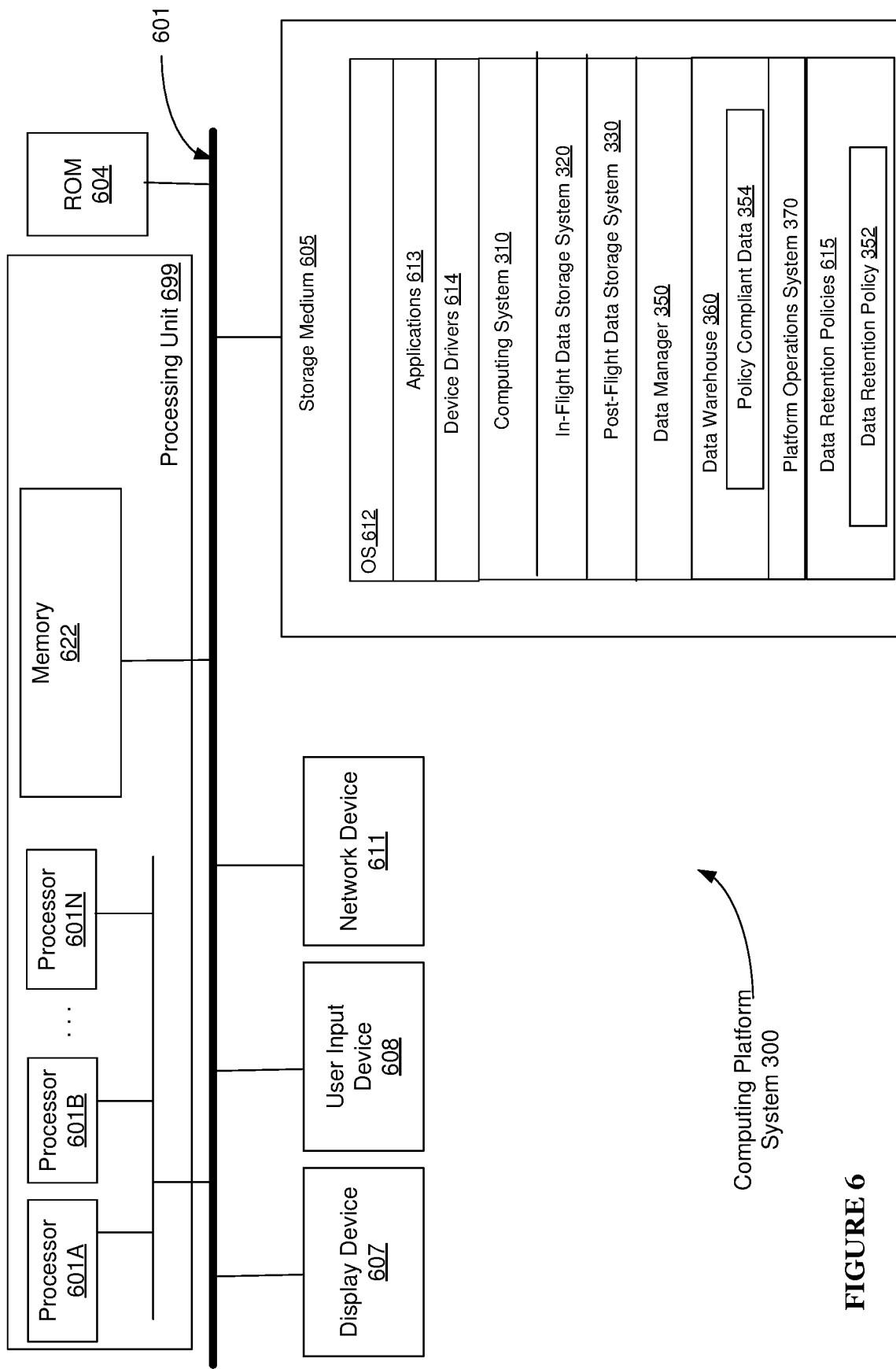
FIG. 6 is an architecture diagram of system of a preferred embodiment.

FIG. 6 is an architecture diagram of a system (e.g., the computing platform system 300 of FIG. 3) according to an implementation in which the system is implemented by a server device. In some implementations, the system is implemented by a plurality of devices. In some implementations, the system 300 is similar to the communication platform 200 of FIG. 2.

The bus 601 interfaces with the processors 601A-601N, the main memory (e.g., a random access memory (RAM)) 622, a read only memory (ROM) 604, a processor-readable storage medium 605, a display device 607, a user input device 608, and a network device 6n.

The processors 601A-601N may take many forms, such as ARM processors, X86 processors, and the like.

In some implementations, the system (e.g., 600) includes at least one of a central processing unit (processor) and a multi-processor unit (MPU).

The processors 601A-601N and the main memory 622 form a processing unit 699. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a computing system, a data manager, a data warehouse, a platform operations system, an in-flight data storage system, a post-flight data storage system, a data retention policy storage system, at least one data retention policy, in-flight data, and post-flight data.

The network adapter device 611 provides one or more wired or wireless interfaces for exchanging data and commands between the system (e.g., 600) and other devices, such as an external system (e.g., 380). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 622 (of the processing unit 699) from the processor-readable storage medium 605, the ROM 604 or any other storage location. During execution of these software programs, the respective machine-executable instructions are accessed by at least one of processors 601A-601N (of the processing unit 699) via the bus 601, and then executed by at least one of processors 601A-601N. Data used by the software programs are also stored in the memory 622, and such data is accessed by at least one of processors 601A-601N during execution of the machine-executable instructions of the software programs. The processor-readable storage medium 605 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 605 includes machine-executable instructions (and related data) for an operating system 612, software programs 613, device drivers 614, the computing system 310, the in-flight data storage system 320, the post-flight data storage system 330, the data manager 350, and the platform operations system 370. In some implementations, the processor-readable storage medium 605 includes machine-executable instructions (and related data) for the data warehouse 360. In some implementations, the data warehouse is external to the system 300. In some implementations, the platform operations system is external to the system 300.

In some implementations, the processor-readable storage medium 605 includes in-flight data. In some implementations, the processor-readable storage medium 605 includes post-flight data. In some implementations, the processor-readable storage medium 605 includes the policy compliant (moderated) data 354. In some implementations, the processor-readable storage medium 605 includes data retention policies 615 of a plurality of accounts of the system 300 (e.g., accounts of the account system 312 of FIG. 3). In some implementations, the processor-readable storage medium 605 includes the data retention policy 352.

6. MACHINES

The systems and methods of the preferred embodiments and variations thereof can be embodied and/or implemented at least in part as a machine configured to receive a computer-readable medium storing computer-readable instructions. The instructions are preferably executed by computer-executable components preferably integrated with the computing platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

6. CONCLUSION

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   accessing, by one or more processors, account data generated based on usage of a computing platform by a corresponding account; and
   moderating, by the one or more processors, the account data based on a data policy that corresponds to the account and defines an action to secure sensitive information, the moderating of the account data including performance of the action defined by the data policy, the moderated account data being accessible by the computing platform.

2. The method of claim 1, wherein:
   the accessing of the account data includes generating the account data on behalf of the corresponding account based on the usage of the computing platform by the corresponding account.

3. The method of claim 1, further comprising:
   accessing the data policy from a configuration file that corresponds to the account.

4. The method of claim 1, further comprising:
   receiving the data policy from the computing system whose usage generation of the account data is based.

5. The method of claim 1, wherein:
   the moderating of the account data includes:
   determining that the account data includes sensitive information; and
   limiting a level of access granted to the computing platform for the sensitive information included in the account data.

6. The method of claim 5, wherein:
   the limiting of the level of access granted to the computing platform includes redacting the sensitive information included in the account data.

7. The method of claim 5, wherein
   the limiting of the level of access granted to the computing platform includes deleting the sensitive information included in the account data.

8. The method of claim 1, further comprising:
   deleting the account data based on expiration of a period of time defined in the data policy since the accessing of the account data.

9. A system comprising:
   one or more processors; and
   one or more computer-readable media storing instructions that, when executed by the one or more processors, cause the system to perform operations comprising:
   accessing account data generated based on usage of a computing platform by a corresponding account; and
   moderating the account data based on a data policy that corresponds to the account and defines an action to secure sensitive information, the moderating of the account data including performance of the action defined by the data policy, the moderated account data being accessible by the computing platform.

10. The system of claim 9, wherein:
the accessing of the account data includes generating the account data on behalf of the corresponding account based on the usage of the computing platform by the corresponding account.

11. The system of claim 9, wherein the operations further comprise:
accessing the data policy from a configuration file that corresponds to the account.

12. The system of claim 9, wherein the operations further comprise:
receiving the data policy from the computing system whose usage generation of the account data is based.

13. The system of claim 9, wherein:
the moderating of the account data includes:
determining that the account data includes sensitive information; and
limiting a level of access granted to the computing platform for the sensitive information included in the account data.

14. The system of claim 13, wherein:
the limiting of the level of access granted to the computing platform includes redacting the sensitive information included in the account data.

15. The system of claim 13, wherein
the limiting of the level of access granted to the computing platform includes deleting the sensitive information included in the account data.

16. A non-transitory machine-readable medium storing instructions that, when executed by one or more processors of a machine, cause the machine to perform operations comprising:
accessing account data generated based on usage of a computing platform by a corresponding account; and
moderating the account data based on a data policy that corresponds to the account and defines an action to secure sensitive information, the moderating of the account data including performance of the action defined by the data policy, the moderated account data being accessible by the computing platform.

17. The non-transitory machine-readable medium of claim 16, wherein:
the accessing of the account data includes generating the account data on behalf of the corresponding account based on the usage of the computing platform by the corresponding account.

18. The non-transitory machine-readable medium of claim 16, wherein the operations further comprise:
accessing the data policy from a configuration file that corresponds to the account.

19. The non-transitory machine-readable medium of claim 16, wherein the operations further comprise:
receiving the data policy from the computing system whose usage generation of the account data is based.

20. The non-transitory machine-readable medium of claim 16, wherein:
the moderating of the account data includes:
determining that the account data includes sensitive information; and
limiting a level of access granted to the computing platform for the sensitive information included in the account data.

\* \* \* \* \*

UNITED STATES PATENT AND TRADEMARK OFFICE
CERTIFICATE OF CORRECTION

PATENT NO. : 11,755,530 B2
APPLICATION NO. : 17/660287
DATED : September 12, 2023
INVENTOR(S) : Ballai et al.

Page 1 of 1

It is certified that error appears in the above-identified patent and that said Letters Patent is hereby corrected as shown below:

On the Title Page

On page 5, in Column 2, under item (56) "U.S. Patent Documents", Line 22, delete "2009/0022131" and insert --2009/0221310-- therefor On page 5, in Column 2, under item (56) "U.S. Patent Documents", Line 68, delete "2010/0029191" and insert --2010/0291910-- therefor On page 6, in Column 1, under item (56) "U.S. Patent Documents", Line 5, delete "2011/0014981" and insert --2011/0149810-- therefor On page 6, in Column 1, under item (56) "U.S. Patent Documents", Line 58, delete "2012/0017361" and insert --2012/0173610-- therefor On page 6, in Column 2, under item (56) "U.S. Patent Documents", Line 59, delete "2014/0037251" and insert --2014/0372510-- therefor In the Claims In Column 20, Line 47, in Claim 7, delete "wherein" and insert --wherein:-- therefor In Column 21, Line 25, in Claim 15, delete "wherein" and insert --wherein:-- therefor Signed and Sealed this
Seventh Day of January, 2025

Derrick Brent
*Acting Director of the United States Patent and Trademark Office*